United States Patent [19]

Harr

[11] Patent Number: 5,195,008

[45] Date of Patent: Mar. 16, 1993

[54] DIFFERENTIAL CURRENT CIRCUIT BREAKER AND A METHOD OF SETTING THE TRIPPING RANGES

[75] Inventor: Dieter Harr, Regensburg, Fed. Rep. of Germany

[73] Assignee: Siemens Aktiengesellschaft, München, Fed. Rep. of Germany

[21] Appl. No.: 512,964

[22] Filed: Apr. 23, 1990

[30] Foreign Application Priority Data

Apr. 24, 1989 [EP] European Pat. Off. ............ 89107388

[51] Int. Cl.$^5$ .............................................. H02H 3/26
[52] U.S. Cl. ........................................ 361/42; 361/45; 361/93
[58] Field of Search ................................. 361/42–45, 361/93, 94, 58

[56] References Cited

U.S. PATENT DOCUMENTS

4,860,146  8/1989  Pohl et al. ............................. 361/42
5,075,642  12/1991  Learned ................................ 331/143

FOREIGN PATENT DOCUMENTS

0167079  1/1986  European Pat. Off. .
0273255  7/1988  European Pat. Off. .
1513571  3/1970  Fed. Rep. of Germany .
2430680  2/1980  France .

Primary Examiner—Todd E. Deboer
Attorney, Agent, or Firm—Kenyon & Kenyon

[57] ABSTRACT

A differential current circuit breaker is disclosed in operation with a transductor circuit. The transformer has a secondary winding which is coupled to a measuring resistor in series with a generator, in particular a square wave generator, for alternating magnetization. The circuit breaker includes an evaluation circuit coupled to a tripping mechanism that acts through a breaker mechanism on switching contacts in the conductors being monitored. The evaluation circuit is coupled to a tap between the secondary winding and the measuring impedance. The generator capable of setting the generator frequency within a larger frequency range than is required to compensate for tolerance adjustment in the generator itself.

3 Claims, 1 Drawing Sheet

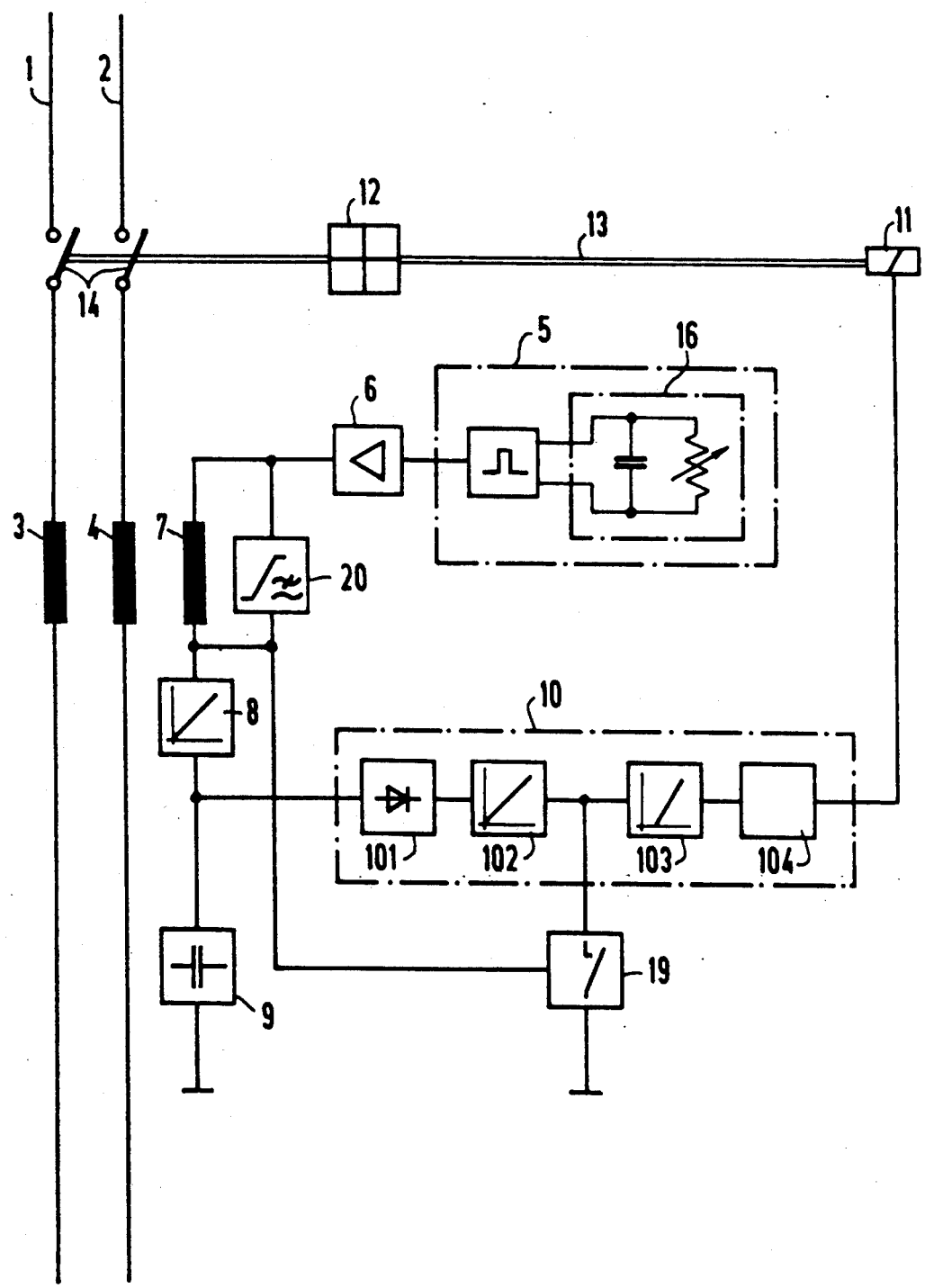

DIFFERENTIAL CURRENT CIRCUIT BREAKER AND A METHOD OF SETTING THE TRIPPING RANGES

BACKGROUND OF THE INVENTION

This invention relates to a differential current circuit breaker operating with a transductor circuit. The secondary winding of the transductor circuit is coupled in series between a measuring impedance and a generator, in particular a square wave generator, for alternating magnetization. An evaluation circuit is coupled to a tripping mechanism that acts via a breaker mechanism upon switching contacts in the conductors to be monitored. The evaluation circuit is coupled to a tap between the secondary winding and the measuring resistor. The resulting signal from the secondary winding is applied to the measuring resistor and is processed in the evaluation circuit to initiate the tripping process. This type of differential current circuit breaker is known and is described in European Patent No. A1-0 167 079.

Differential current circuit breakers are used to respond to leakage currents comprising filtered d.c. current, pulsating a.c. current (i.e. with aperiodic components), and a.c. current.

In the case of a square hysteresis loop, core material for the summation current transformer has relatively narrow, manufacturing tolerances as well as coercive field strength during saturation induction and remanent induction. In light of this, the tripping action for filtered d.c. current can be adjusted rather easily. However, for tripping alternating and pulsating currents, the induction range of the iron core is of considerable importance. As a rule, this induction range is not defined by the manufacturer, nor is it guaranteed in tolerances.

In practice, relatively large variances appear from core to core. In alternating and pulsating currents, the tripping values of a differential current circuit breaker can not be easily adjusted and require several processing steps. Thus, several compensating devices are usually provided for a differential current circuit breaker. There is a need for an improved differential current circuit breaker that can be easily and simply set to a desired response range within a sample series by using one frequency tuner.

SUMMARY OF THE INVENTION

This and other needs are solved by the present invention of a differential current circuit breaker and a method for setting the tripping ranges. The generator includes means for adjusting the generator frequency over a larger frequency range than is required to compensate for tolerance in the generator itself. This type of a differential current circuit breaker makes it possible to set the desired tripping range within a type series by adjusting the generator frequency using a control sample. Because of this, the voltage ratio of the voltage at the inductance of the secondary coil to the voltage at the measuring inductance during operation is again adjusted to the same ratio that was determined for the control sample. The tripping values for the various types of leakage currents can thus be set in the usual manner and, in a sample series, the individual differential current circuit breakers can be adjusted merely by tuning the generator frequency to the tripping action of the control sample. Present typical setting devices can also be used in addition, although they are not required.

By using a generator with an RC-element, an adjustable resistor and/or an adjustable capacitor can be provided as a device for adjusting the frequency.

The method of setting the tripping range of a differential current circuit breaker of the described type comprises setting the tripping range by adjusting the generator frequency while applying a sample series of inputs.

BRIEF DESCRIPTION OF THE DRAWING

The sole drawing is a block diagram of a differential current circuit breaker constructed according to the present invention.

DETAILED DESCRIPTION

Referring to the sole drawing, the differential current circuit breaker according to the present invention is shown. The differential current circuit breaker monitors an external conductor or phase conductor I and a middle conductor or neutral conductor 2. The primary windings 3 and 4 of a summation current transformer with a secondary winding can simply comprise lead-in conductors or a winding of the conductor being monitored. Voltage is supplied by a square wave generator 5 through an amplifier 6 to the secondary winding 7 of the summation current transformer. This voltage produces an alternating magnetization of the core of the summation current transformer. The summation current transformer is thus premagnetized in this manner. In this embodiment, an integrating and damping element 8 and a capacitive measuring impedance 9 are located downstream from the secondary winding 7. A voltage signal appears across the measuring impedance 9 which is used as an input signal for the evaluation circuit 10. At the same time, the capacitive measuring impedance 9 electrically isolates the alternating magnetized current which is symmetrical to the reference potential of the electronic components. The electronic components such as the generator 5 and the evaluation circuit 10 are supplied with circuit board supply voltage through one or more power supply units.

In this embodiment, the evaluation circuit 10 comprises a full wave rectifier 101, an integrating element 102, and a threshold trigger switch 103. The threshold trigger switch 103 operates on a contact element 104. The contact element 104 operates on a tripping mechanism 11, which triggers a breaker mechanism 12 via an operative coupling 13. The breaker mechanism 12 opens the switching contacts 14 in the conductors 1 and 2 being monitored.

A coupling switch 19 acts as a sensor and a barrier. The coupling switch 19 is coupled to a point between the secondary winding 7 and the integrating and damping element 8. The coupling switch 19 acts on the evaluation circuit 10 before the threshold trigger switch 103 and after the integrating element 102. The coupling switch 19, which is described in detail in European Patent No. A1-0 273 255, responds to surge currents or surge voltages by blocking the response of the differential current circuit breaker whenever these currents or voltages interfere.

The summation current transformer is alternately magnetized by the high frequency a.c. voltage from the generator 5. The a.c. voltage is applied to the secondary winding 7 so that the winding is close to its saturation limit. When a current flows through the primary windings 3 and 4, a current is induced in the secondary winding 7. This current is superimposed on the alternating magnetized current. In this manner, the saturation limit can be exceeded and the inductive impedance of the secondary winding 7 is reduced. In this case, the voltage in the secondary winding 7 becomes smaller and the voltage amplitude at the measuring impedance 9 becomes greater. In the evaluation circuit 10, the voltage at the measuring impedance 9 is compared with a preset threshold voltage, and when the threshold voltage is exceeded, the tripping mechanism 11 is activated, which then interrupts the conductors being monitored.

In this embodiment, a filter element 20 is connected in parallel with the secondary winding 7 and is preferably designed as a low-pass filter. This filter element 20 blocks secondary signals with low frequencies from the coupling switch 19 so that the differential current circuit breaker can immediately trip in case of low frequencies. The evaluation circuit 10 is blocked from surge currents with high frequencies, which usually cause false releases.

The tripping action of the differential current circuit breaker can be determined using a control sample. The differential current circuit breakers can then be set to the tripping range within a sample series so that the generator frequency is altered until the desired tripping action begins. Although it is known how to adjust frequency for the tolerance of the generator using setting devices, as a rule, a frequency can only be altered ±10% in this situation. In contrast, the differential current circuit breaker of the present invention has a generator whose means of setting the frequency allow the frequency to be adjusted over a greater frequency range, for example ±25% or more, not in order to offset an error in the generator frequency, but rather to compensate for the considerable tolerance of the core material from the summation current transformers. In the illustrated embodiment, the generator 5 includes an RC-element 16 having an adjustable resistor. Thus, the frequency can be adjusted using this resistor. The capacitor could also be varied. Any frequency generator which has a frequency range adjustable at least on the order of ±25% can be used. Thus, the voltage ratio of the voltage at the inductive impedance of the secondary winding 7 to the voltage to that of the capacitive impedance 9 can be altered so that it corresponds to a control sample. In this manner, the tolerance of the core material for the summation current transformer, which can vary with regard to the induction range in a range of ±150%, can be compensated. Thus, compensation with one single impedance is possible.

I claim:

1. A differential current circuit breaker operating with a transductor circuit monitoring a plurality of conductors, comprising:

a transformer having a primary winding in series with all of said plurality of conductors to be monitored and a secondary winding;

a measuring impedance in series with said secondary winding;

a voltage generator providing an alternating output signal, wherein a frequency of said alternating output signal is adjustable over a frequency range larger than a frequency range required to compensate for tolerance in said voltage generator, said voltage generator coupled to and supplying said output signal through said secondary winding and said measuring impedance;

an evaluation circuit having an input coupled to a tap located between said secondary winding and said measuring impedance;

a tripping mechanism responsive to said evaluation circuit;

switching contacts in said conductors to be monitored; and a breaker mechanism coupled to open and close said contacts of said breaker mechanism responsive to said tripping mechanism to open said contacts.

2. The differential current circuit breaker of claim 1, wherein said generator is a square wave generator.

3. A method of setting the tripping range of a circuit breaker which includes:

a transformer having a primary winding in series with a plurality of conductors to be monitored and a secondary winding;

a measuring impedance in series with said secondary winding;

a voltage generator providing an alternating output signal, wherein a frequency of said alternating output signal is adjustable over a frequency range larger than a frequency range required to compensate for tolerance in said voltage generator, said voltage generator coupled to and supplying said output signal through said secondary winding and said measuring impedance;

an evaluation circuit having an input coupled to a tap located between said secondary winding and said measuring impedance;

a tripping mechanism responsive to said evaluation circuit;

switching contacts in said conductors to be monitored; and a breaker mechanism coupled to open and close said contacts of said breaker mechanism responsive to said tripping mechanism to open said contacts said method comprising:

(a) supplying to said breaker a sample series of current at which tripping is required;

(b) setting the frequency of said generator to cause said breaker to trip.

* * * * *